United States Patent [19]
Filreis

[11] 3,819,037
[45] June 25, 1974

[54] CABLE PLUGGING APPARATUS
[75] Inventor: Manuel Filreis, Edina, Minn.
[73] Assignee: Minnesota Mining and Manufacturing Company, St. Paul, Minn.
[22] Filed: Aug. 28, 1972
[21] Appl. No.: 283,913

[52] U.S. Cl.............. 206/222, 206/47 A, 222/82
[51] Int. Cl............................................ B65d 79/00
[58] Field of Search ........................... 222/80–91, 222/94, 95, 136, 137, 541, 389–391; 128/217 A, 218 D, 218 DA, 218 M, 218 V, 215 N, 272; 174/76; 206/46 L, 47 R, 47 A, 56 R, 56 G

[56] References Cited
UNITED STATES PATENTS

| 2,733,836 | 2/1956 | Switzer | 222/82 |
| 2,923,442 | 2/1960 | Maras | 222/327 |
| 2,967,795 | 1/1961 | Bollmeier | 174/76 X |
| 3,363,811 | 1/1968 | Geist | 222/541 |
| 3,489,147 | 1/1970 | Shaw | 222/137 X |
| 3,636,950 | 1/1972 | Gomez | 128/218 D |

Primary Examiner—Stanley H. Tollberg
Assistant Examiner—Larry Martin
Attorney, Agent, or Firm—Alexander, Sell, Steldt & DeLaHunt

[57] ABSTRACT

Sheathed electrical cables are plugged using a split sleeve sealed hermetically over an opened cable section and having an access nipple for inserting hardenable liquid from a disposable container serving as a pressure applicator.

2 Claims, 6 Drawing Figures

PATENTED JUN25 1974 3,819,037
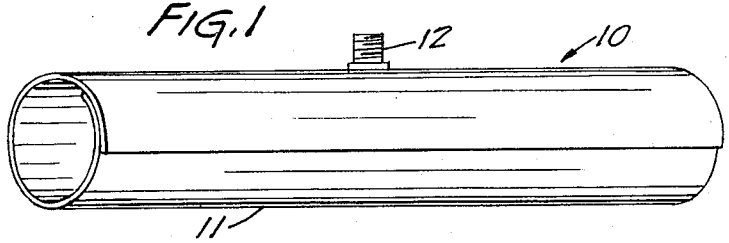
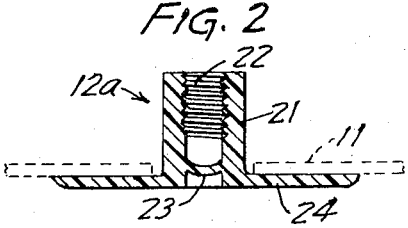
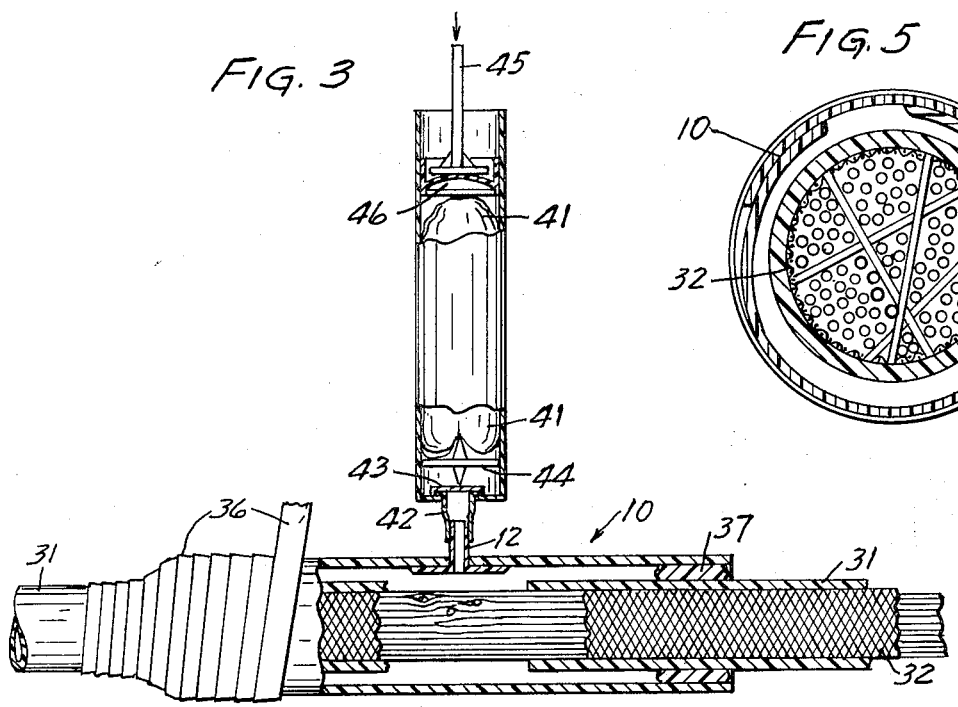
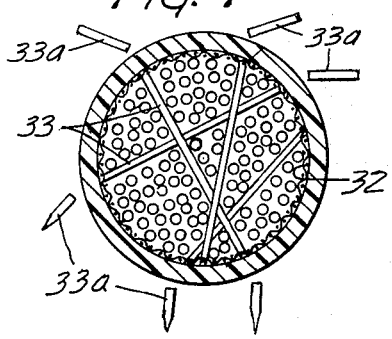
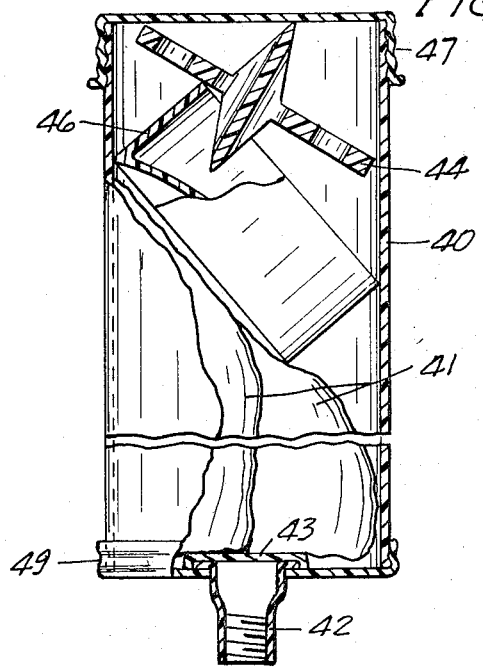

CABLE PLUGGING APPARATUS

This invention relates to the plugging of sheathed cables such for example as telephone and electric power cables, and in particular to method and apparatus useful therein.

The protective sheaths of lead or plastic material placed around multiple-pair telephone cables sometimes develop small, difficultly detectable leaks through which moisture may enter the cable to cause communication difficulties. It is therefore common practice to maintain a dry gaseous atmosphere under pressure within such cables whereby to prevent inward leakage of moisture. To isolate portions of the cable, it is also customary to provide dams or plugs inside the sheaths at selected locations. These plugs are best formed by injection of a hardenable liquid, preferably a resinous composition, which fills the voids around the wires and between wires, shield and sheath along a length of cable sufficient for the purpose, and then hardens.

Terminal plugs have previously been formed by pouring hardenable liquid resin into open funnel-like cups placed over the cable end, as shown in U.S. Pat. No. 3,150,221. For pressure application intermediate the cable ends, adherent fittings as shown in U.S. Pat. No. 3,188,121 have been used, the hardenable liquid resin then being introduced from a pressure gun. The liquid resin may be prepared by mixing together two interreactive portions in a flexible envelope as described in U.S. Pat. No. 3,087,606, and applied directly from the bag as shown in U.S. Pat. No. 2,967,795, for example using the modified nozzle of U.S. Pat. No. 3,111,269.

The present invention likewise provides a fitting for the cable and means for introducing liquid resin through said fitting and into the cable under pressure, but provides a number of advantages as will become apparent from the following description taken in conjunction with the appended drawing, wherein FIG. 1 is a view in perspective of a flexible fitting, FIG. 2 is a view in cross-section of one form of nipple, FIG. 3 is a side elevation, partly cut away, showing a resin applicator in position on a fitting applied to a sheathed cable, FIG. 4 is a transverse sectional view of the cable in opened condition, FIG. 5 is a transverse sectional view of the cable and fitting in readiness for injection of hardenable liquid, and FIG. 6 illustrates in partial section a storage assembly of applicator and contents.

As shown in FIG. 1, the fitting 10 consists of a split tubular sleeve 11 centrally perforated and fitted with a nipple 12. The sleeve is sufficiently resilient to maintain a cylindrical configuration when at rest but is adequately flexible to be placed around the outer surface of a cable around which it is to be wrapped with the longitudinal edges overlapping. The nipple, here illustrated as externally threaded, may alternatively be provided with an internal thread and if desired, particularly for use on power cables, may be supplied with an internal valve. As illustrated in FIG. 2, such an alternate structure 12a may include a tubular body 21 having an internally screw threaded open outer end 22, closed near the inner end with a simple one-way flap valve 23, and expanded radially at the inner end to form an attachment flange 24 which is bonded against the inner surface of the split sleeve 11 of FIG. 1 shown here in partial phantom cross-section. The sleeve and nipple may also be formed as a unitary structure. Sleeves of 60 mil polycarbonate are found to be effective; other materials, such for example as cellulose acetate butyrate or polyvinyl chloride, may be used in thicknesses providing analogous degrees of resilient rigidity.

The fitting is applied as shown in FIGS. 3–5. A short section of the cable sheath 31 is first removed to expose the conductive shield 32 which is longitudinally slit and laid back as shown in FIG. 4. Insulating pins 33 are forced between the several wire-bundles 34 to provide passages for resin penetration, the protuding ends 33a being then cut off and removed. The shield is then brought back as closely as possible about the area and the whole is enclosed within the fitting 10, all as shown in FIGS. 3 and 5. A wrapping 36 of plastic adhesive electrical insulating tape is laid on over the entire area to form a resintight pressure-resistant covering. The sleeve 11 fits snugly around the external shape of the cable, leaving minimal voids and assuring a hermetic seal on application of the tape covering. If desired, a thin strip of soft mastic 37 may first be placed around the cable near each end of the sleeve to provide an additional seal, but the close conformity of sleeve to cable makes this refinement unnecessary in most cases. Hose clamps applied around the sleeve above the mastic strips may be used in place of the wrapping of tape, in which case a further strip of mastic should be inserted between the overlapping longitudinal margins of the sleeve.

The resin and applicator are supplied in the form of the assembly illustrated in FIG. 6 and including a protective cylinder 40 enclosing a multi-compartment plastic envelope 41 of resin-forming components, a puncture disc 44, and a plunger 46.

The cylinder 40 is provided at one end with a nozzle 42, here illustrated as internally threaded for connection with a nipple 12, and closed with a diaphragm 43 over the inner end. An inexpensive and preferred form of cylinder, which effectively protects the envelope and contents from possible degradation by atmospheric contact, has a rigid spirally wound paper body covered at least on the inner surface, and preferably also on the outer surface, with a leakproof protective layer 48 of aluminum foil. A metal annulus 49 crimped to one end of the cylinder supports the nozzle 42 which is sealed with a segment of aluminum foil serving as the diaphragm 43. The other end of the cylinder is sealed with a removable screw cap 47. Cylinders of metal or plastic are also useful; pull-top or other forms of caps may replace the screw cap closure.

The puncture disc 44 consists of a multiperforate thin disc, preferably of hard plastic material, having a central deeply fluted pointed boss at each surface, and fitting loosely within the cylinder. The plunger 46 has a wide peripheral wall and a curved central web. It fits snugly within the cylinder when in operating position but is sufficiently soft and resilient to be placed at an angle as shown in FIG. 6 where it serves both to protect the envelope 41 from the pressure disc 44 and to assist in holding the envelope from movement within the cylinder.

The puncture disc, plunger and envelope of resin are easily removed from the cylinder through the open top by shaking, the mass of the resin being sufficient to overcome the frictional resistance of the plunger. The resin-forming contents are mixed within the envelope which is then again inserted into the cylinder but above the puncture disc and followed by the plunger in operating position, all as shown in FIG. 3. The fitting 10 is applied to the previously opened and prepared cable, and the nozzle 42 threaded onto the nipple 12. Pressure is applied against the envelope through the plunger 46 using a conventional caulking gun or other suitable apparatus here indicated by ram 45 and a directional arrow. Under the pressure applied, the opposing points of the disc 44 puncture both the diaphragm 43 and the envelope 41. The liquid resin flows along the fluted sides of the points and through the perforate disc, and is forced into the cable. Complete filling of all voids is quickly accomplished. The ram 45 is then withdrawn and the cylinder is unscrewed and removed from the fitting, and discarded.

What is claimed is as follows:

1. A resin applicator assembly comprising: an open-ended rigid cylinder terminating at its other end in a centrally disposed threaded axially extending nozzle, and a protective diaphragm over the inner end of said nozzle; and, within said cylinder, a multi-compartment flexible mixing envelope containing the components of a self-hardening liquid resin mixture, a plunger slidably fitting within said cylinder, and a perforate puncture disc loosely fitting within said cylinder and having centrally of each face a pointed axially extending projection; and said plunger being positioned between said envelope and said disc, said open-ended cylinder being sealed with a removable cap, and said disc positioned adjacent said cap.

2. The assembly of claim 1 wherein said plunger consists of a shallow generally cup-shaped element having a centrally inwardly curved bottom and is sufficiently soft and resilient to be placed at an angle within said cylinder.

* * * * *